UNITED STATES PATENT OFFICE.

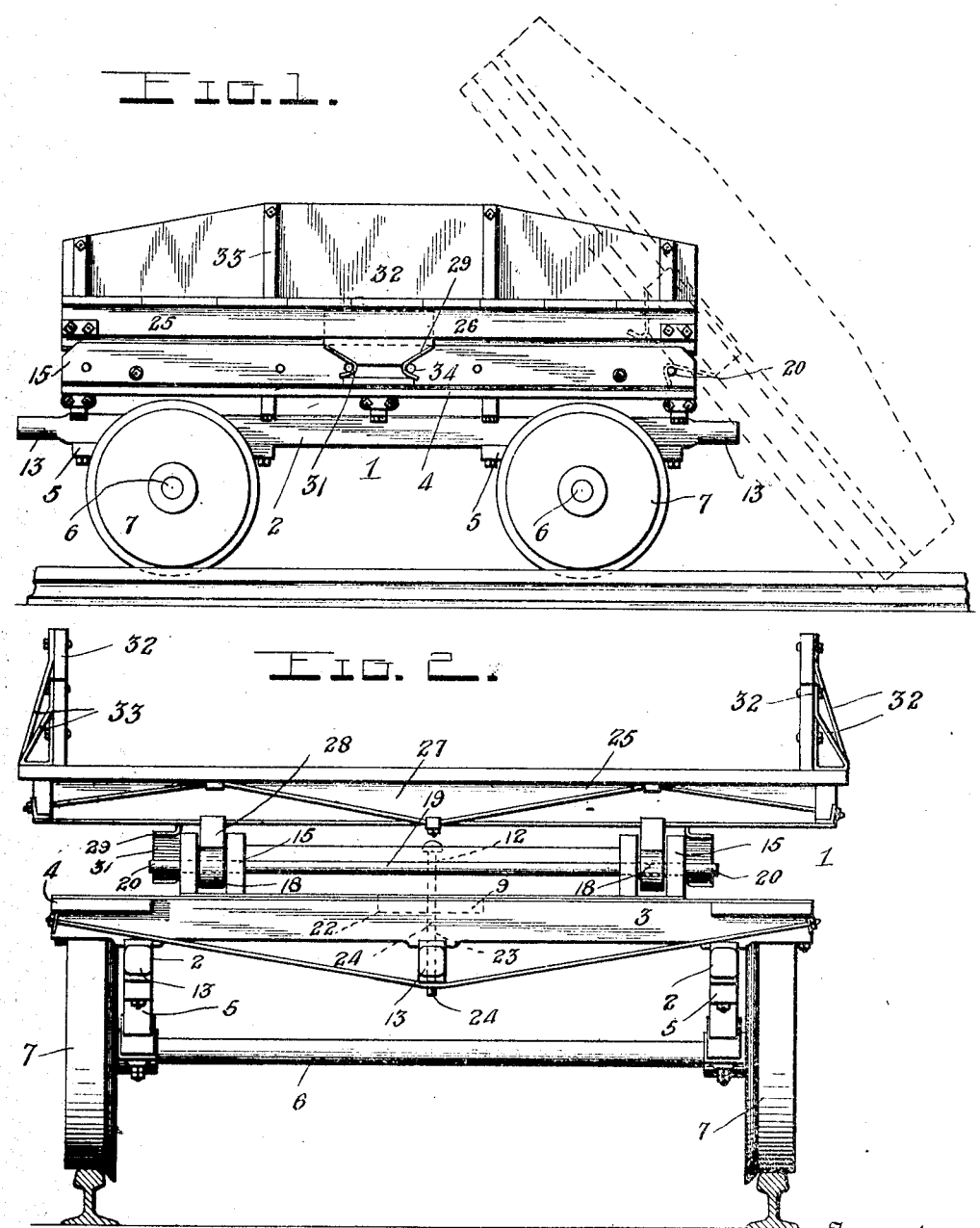

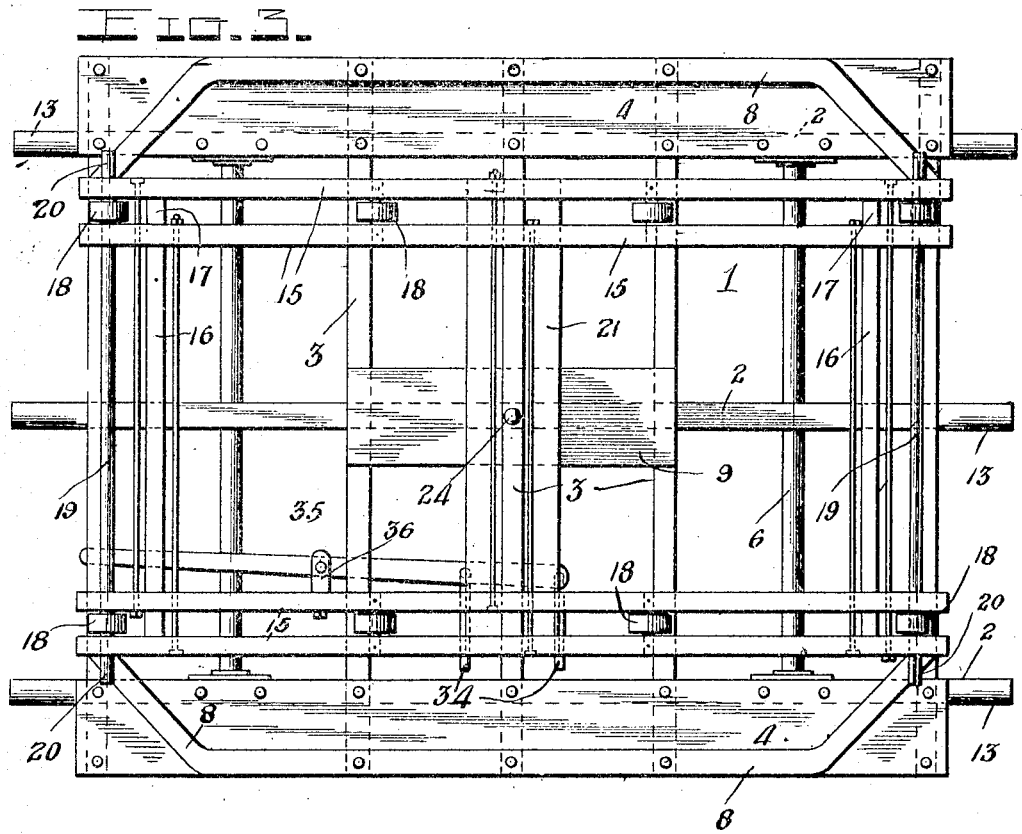
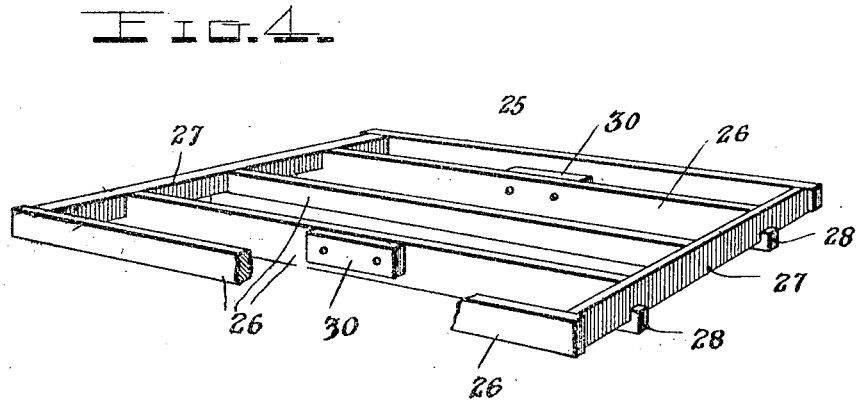

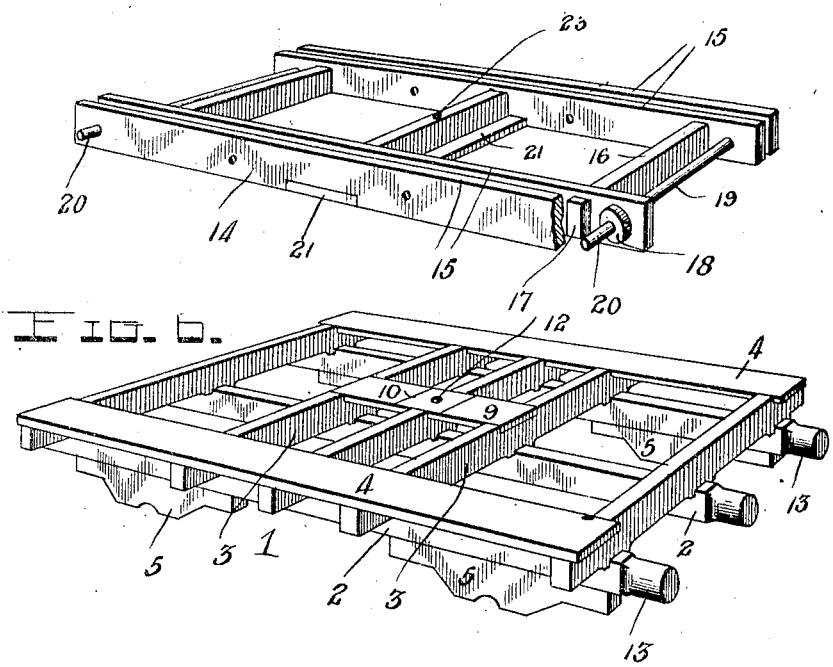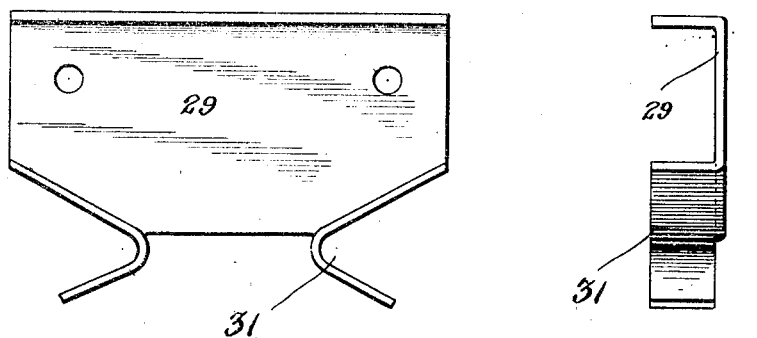

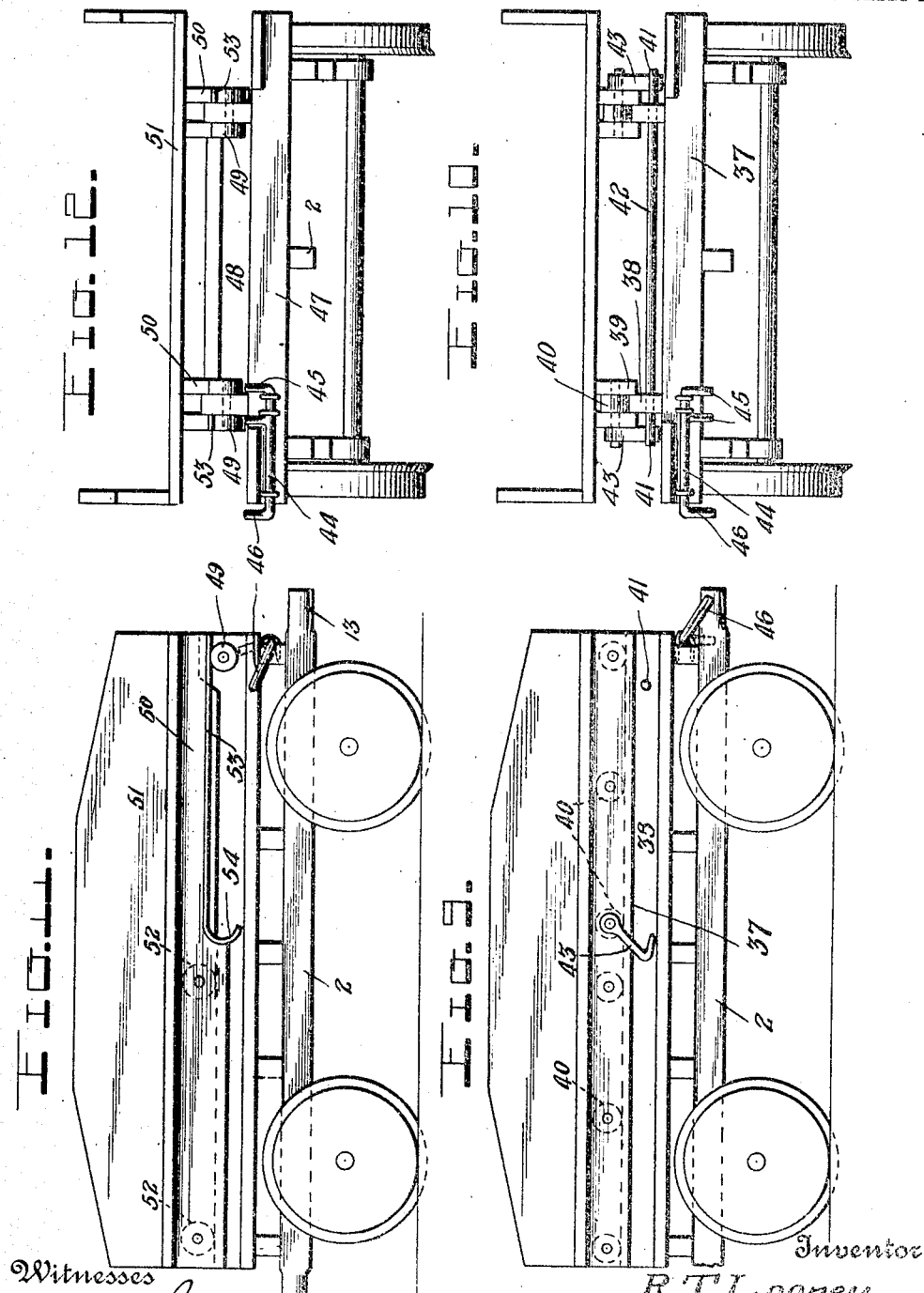

RICHARD T. LOONEY, OF HANCOCK, MICHIGAN.

DUMPING PUSH-CAR.

No. 891,942.  Specification of Letters Patent.  Patented June 30, 1908.

Application filed October 24, 1907. Serial No. 399,007.

*To all whom it may concern:*

Be it known that I, RICHARD T. LOONEY, a citizen of the United States, residing at Hancock, in the county of Houghton and State of Michigan, have invented certain new and useful Improvements in Dumping Push-Cars; and I do declare the following to be a full, clear, and exact description of the invention, such as will enable others skilled in the art to which it appertains to make and use the same.

This invention relates to improvements in dumping push cars.

The object of the invention is to provide a car of this character, the body portion of which may be readily turned and dumped in any desired direction.

A further object is to provide a dumping car which will be simple, strong and durable in construction, efficient and reliable in operation and well adapted to the purpose for which it is designed.

With the foregoing and other objects in view, the invention consists of certain novel features of construction, combination and arrangement of parts, as will be more fully described and particularly pointed out in the appended claims.

In the accompanying drawings: Figure 1 is a side view of a car constructed in accordance with the invention showing in dotted lines the dumping position of the body. Fig. 2 is an end elevation. Fig. 3 is a top plan view of the truck frame and roller bed with the body of the car removed. Fig. 4 is a perspective view of the dumping body frame. Fig. 5 is a similar view of the roller bed. Fig. 6 is a similar view of the truck frame. Figs. 7 and 8 are respectively, detailed side and end views of one of the dumping hangers. Fig. 9 is a side view of a modified form of car. Fig. 10 is an end view of the same. Fig. 11 is a side view of another modified form of the car; and Fig. 12 is an end view of the same.

Referring more particularly to the drawings, 1 denotes the truck frame which consists of a series of longitudinally disposed bars or bolsters, 2, on the upper edges of which are secured a series of transversely disposed bars, 3, which are connected together at their outer ends by longitudinally disposed side boards, 4. To the outer side bolsters, adjacent to their opposite ends are secured bearing blocks, 5, in which are journaled front and rear supporting axles, 6, on the ends of which are mounted the truck supporting wheels 7.

Secured to the upper edges of the cross bars, 3, and the side boards, 4, is an octagonal shaped metal frame, 8, the purpose of which will hereinafter appear. Secured to the inner cross bars, 3, is a central, longitudinally disposed swivel board, 9, at the center of which is secured a swivel or pivot plate, 10, said plate and board being provided with alined centrally disposed apertures, 12. The outer ends of the bolsters, 2, are preferably reduced and rounded to form handles, 13, by means of which the truck may be lifted or pushed along.

On the truck frame is arranged a roller bed or frame, 14, which consists of pairs of longitudinally disposed bars 15, which are connected together by a series of cross bars, 16. The bars of each pair are spaced apart and secured in parallel relation by means of spacing blocks, 17, and between said bars are revolubly mounted a series of supporting rollers, 18, of which there may be any desired number, four of said rollers being shown in the present instance as being mounted between each pair of bars, 15. The outer rollers at each end of the bars, 15, are mounted upon transversely disposed shafts, 19, arranged in the outer ends of the bars, 15, as shown. The opposite ends of the shafts, 19, project beyond the outer side bar of each pair of bars, 15, to provide pivot pins, 20, the purpose of which will hereinafter appear. The intermediate rollers, 18, are journaled on short shafts arranged in the bars, 15, as shown. Secured to the lower edge of the bars, 15, and to the lower edge of the centrally disposed cross bar, 16, is a swivel board, 21, to the lower side of which is secured a centrally disposed pivot or swivel plate, 22, said plate and board, as well as central cross bar, 16, being provided with an alined aperture, 23, through which is adapted to be inserted a king bolt or pivot pin, 24, said bolt being also engaged with the aperture, 12 in the pivot plate and swivel board, 9, of the truck frame thereby pivotally connecting the roller bed or frame with the truck frame and permitting said roller bed to be swung around in any direction on the truck frame. The outer ends of the roller bed or frame are supported in their pivotal or swinging movement upon the octagonal shaped metal frame, 8, which is arranged on the truck frame as hereinbefore described.

Adapted to be supported upon the roller bed or frame is a dumping body frame, 25, said frame consisting of a series of longitudinally disposed bars, 26, which are connected together at their opposite ends by cross bars, 27. The longitudinal bars, 26, which are disposed next to the outer or side bars are of greater width than the other longitudinal bars and project below the same and below the end cross bars to form tracks, 28, which when the body frame is in position upon the roller bed are adapted to enter between the pairs of bars, 15, and to engage the rollers, 18, of said frame. By thus supporting the body frame upon the roller bed said frame and the body of the car may be readily pushed forwardly or rearwardly toward the opposite ends of the roller bed.

In order to limit the movement of the dumping body frame on said roller bed and to provide means whereby the same may be dumped, I provide hangers, 29, which are adapted to be secured to spacing blocks, 30, which in turn are bolted to the outer sides of the track bars, 26, of the body frame. The hangers, 29, are preferably in the form of flat plates having a right angularly bent upper edge and which are formed at their opposite ends adjacent to their lower edges with oppositely projecting hooks, 31, which when the body frame is moved in one direction or the other over the roller bed will engage the pivot pins, 20, which project from the sides of the bars, 15, of said roller bed. The engagement of the hooks, 31, with the pins, 20, forms a hinge upon which the body frame may be tilted to discharge the contents of the car body. By turning the roller bed on the truck frame, as hereinbefore described, the body frame may be dumped in any desired direction, as will be understood.

A suitable flooring is secured to the upper edges of the bars, 26 and 27, of the dumping body frame, and if desired side boards, 32, may be secured to the outer side bars of the frame to form a car body. Secured to the outer sides of the side boards, 32, are longitudinally disposed handle bars, 33, by means of which the roller bed may be turned upon the truck frame and the body frame tilted to dump the contents of the car. The arrangement of the hooks, 31, on the dumping hangers, 29, is such that after the load has been discharged from the car body, said body will by its own weight, drop back in position upon the roller bed.

In order to lock the body frame in position upon the roller frame, I provide a pair of locking bolts, 34, which are slidably mounted in passages formed through the parallel roller supporting bars, 15, of the roller bed and to project beyond the outer side of said bars in position to engage the hooks, 31, of the hanger plates, thus preventing the movement of the body frame in either direction. The bolts, 34, are pivotally connected at their inner ends to an operating lever, 35, which is pivotally mounted in a bracket, 36, on the inner side of one pair of the bars, 15. The outer end of the lever, 35, projects toward one end of the truck frame in position to be conveniently reached by the operator. By means of the lever, 35, the locking bolts, 34, may be retracted and disengaged from the hooks, 31, thus permitting the body frame to be moved in either direction toward the ends of the roller bed.

In Figs. 9 and 10, of the drawings, is shown a modified construction of car in which the truck frame is the same as described in connection with the first figures of the drawings and upon which is pivotally mounted in a similar manner a bed, 37, which corresponds to the roller bed, 14, but differs therefrom, in that instead of providing the said bed with the rollers, the bed, 37, is provided with longitudinally disposed track bars, 38, while the dumping body frame is provided with pairs of longitudinally disposed roller supporting bars, 39, between which are journaled rollers, 40, which are adapted to travel upon the tracks, 38, of the roller bed, 37, this arrangement being the reverse of that shown and described in the first figures of the drawing. The track bars, 38, of the bed frame, 37, are provided with laterally projecting stop pins, 41, which are preferably formed by the projecting ends of a transversely disposed shaft, 42, arranged between the track bars, as shown. The stop pins, 41, are adapted to be engaged by hangers, 43, which are preferably in the form of hooks mounted upon the projecting pins of one of the shafts of the rollers, 40, whereby when the body frame is moved along over the track bars, 38, toward the end of the car, said hooks, 43, will come into engagement with the stop pins, 41, thus limiting the forward movement of the car frame or body which may be then readily tilted on the axle or shaft of the roller to which the hanger is connected.

In order to prevent the pivoted track bed, 37, from casually swinging or turning on the truck frame, I provide a locking device which is here shown and preferably consists of a shaft, 44, pivotally mounted in suitable bearings on the outer side of one of the cross bars of the truck frame. On the shaft 44 adjacent to its inner end are formed right angularly projecting parallel stop pins, 45, which are spaced apart and are adapted to be swung upwardly into engagement with the track bars, 30, of the frame, 37, thus preventing the turning of said frame. The outer end of the shaft, 44, may be bent to provide a suitable handle, 46, by means of which the shaft, 44, may be turned.

In Figs. 11 and 12 is shown another modified form of car in which the truck frame, 47, is similar in construction to the forms hereinbefore described and has pivoted or swiveled thereon a combined track and roller bed, 48, on which is arranged longitudinally disposed track bars on the opposite sides of which, adjacent to one end are mounted supporting rollers, 49, which are adapted to be engaged by pairs of track bars, 50, arranged on the dumping body frame, 51. Between the pairs of track bars, 50, at the opposite ends of the same and in rear of the roller engaging portions thereof are mounted supporting rollers, 52, which are adapted to travel upon the rear portions of the combined roller and track bars, 48. The forward ends of the pairs of track bars, 50, of the body frame or that portion of said bars which engage the supporting rollers, 49, is of less width than the rear portion of the bars and on the lower edge of said forward portions are arranged shoes or tracks, 53, which extend inwardly to near the center of the track bars, 50, and are bent downwardly at their inner ends to form hooks, 54, which when the body frame is rolled or moved forwardly on the track bars, 48, will engage the rollers, 49, and thereby form a hinge by means of which the forward projecting end of the body may be tilted to discharge the contents thereof.

In order to prevent the roller bed from turning upon the truck frame, a locking device, 44, similar to that shown and described in connection with Figs. 9 and 10 is employed.

While the roller bed or frame 14 is herein shown and described as being pivotally mounted on the truck frame 1 at its center by a king bolt or pivot pin 24, and supported at its outer ends in its pivotal movement, upon the octagonal-shaped metal frame 8, it is obvious that the roller bed may be pivoted or swiveled and supported on the truck frame in any suitable manner, as, for instance, upon rollers arranged in the truck frame.

Having thus described my invention, what I claim as new and desire to secure by Letters Patent, is:

1. In a push car, a truck frame, a roller bed pivotally mounted on said truck frame, a dumping body frame slidably mounted on said roller bed, means to lock said dumping body frame in operative position on said roller bed, and means whereby said body frame is held in position to be dumped in any direction, substantially as described.

2. In a push car, a truck frame, a roller bed pivotally mounted on said truck frame, a dumping frame on said roller bed, a locking lever pivotally mounted on said roller bed, and locking pins connected to said lever and adapted to be engaged with said dumping frame to lock the same in operative position, substantially as described.

3. In a push car, a truck frame, a roller bed pivotally mounted on said truck frame, a dumping body frame slidably mounted on said roller bed and means whereby said body frame is held in position to be dumped in any direction, substantially as described.

4. In a push car, a truck frame, a roller bed pivotally mounted on said truck frame, a dumping body frame, supporting rollers and track, whereby said body frame is slidably mounted on said roller bed, and means whereby said body frame is held in a position to be dumped in any direction, substantially as described.

5. In a push car, a truck frame, a roller bed pivotally mounted on said truck frame, a dumping body frame supporting rollers and tracks whereby said body frame is slidably mounted on said roller bed, stop pins on said roller bed and hangers on said body frame to engage said pins and thereby hold said body frame in dumping engagement with the roller bed, substantially as described.

6. In a push car, a truck frame, a roller bed pivotally mounted on said truck frame, supporting rollers journaled in said roller bed, a body frame, track bars arranged in said body frame and adapted to engage said rollers, whereby said body is slidably mounted on said roller bed, and adapted to be turned therewith in any direction and means whereby said body frame is hingedly connected with one end or the other of said roller bed to permit said body frame to be dumped in any desired direction, substantially as described.

7. In a push car, a truck frame, a roller bed having a central pivotal connection with said truck frame, parallel longitudinally disposed roller supporting bars, rollers journaled between said bars, a dumping body frame, track bars arranged on said body frame and adapted to engage said rollers, whereby said body frame is slidably mounted on said roller bed, stop pins arranged at each end of said supporting bars and hangers secured to opposite sides of said body frame and adapted to be engaged with said stop pins when said body frame is moved from one direction or the other on said roller bed, thereby providing a hinge connection between said body frame and roller bed, whereby said body frame may be tilted or dumped, substantially as described.

8. In a push car, a wheeled truck frame comprising a series of longitudinally disposed bolsters, a series of transversely disposed bars connecting said bolsters, side boards connecting the outer ends of said bars, an apertured swivel board, an apertured pivot plate on said board, a roller bed comprising pairs of longitudinally disposed roller supporting bars, a series of cross bars connecting said longitudinal bars, an apertured swivel board secured to the lower side of said bars, at the center of said bed, a pivot plate on the lower side of said swivel board, a king bolt arranged in the apertured swivel boards and plates of said roller bed and truck frame, whereby said roller bed is pivotally mounted on said truck frame, supporting rollers journaled between said pairs of longitudinal bars of said roller bed, a body frame comprising a series of longitudinally disposed bars, end cross bars to connect said longitudinal bars, together, roller engaging tracks formed on two of said longitudinal bars to engage the said supporting rollers in said roller bed, stop pins arranged at the opposite ends of said roller bed, hangers arranged on said track bars midway between the ends of said body frame and adapted to be brought into engagement with said stop pins at one end or the other of said roller bed whereby said body frame is hingedly connected thereto and permitted to dump thereon, substantially as described.

In testimony whereof I have hereunto set my hand in presence of two subscribing witnesses.

RICHARD T. LOONEY.

Witnesses:
JAMES D. LOONEY,
W. H. CHARLTON.